United States Patent
Olgaard et al.

(10) Patent No.: US 9,485,040 B2
(45) Date of Patent: Nov. 1, 2016

(54) METHOD FOR TESTING SENSITIVITY OF A DATA PACKET SIGNAL TRANSCEIVER

(71) Applicant: LITEPOINT CORPORATION, Sunnyvale, CA (US)

(72) Inventors: Christian Volf Olgaard, Saratoga, CA (US); Guang Shi, San Jose, CA (US)

(73) Assignee: LitePoint Corporation, Sunnyvale, CA (US)

( * ) Notice: Subject to any disclaimer, the term of this patent is extended or adjusted under 35 U.S.C. 154(b) by 0 days.

(21) Appl. No.: 13/959,354

(22) Filed: Aug. 5, 2013

(65) Prior Publication Data

US 2015/0036729 A1 Feb. 5, 2015

(51) Int. Cl.
*H04B 17/00* (2015.01)
*H04B 17/318* (2015.01)
*H04B 17/29* (2015.01)

(52) U.S. Cl.
CPC ............ *H04B 17/318* (2015.01); *H04B 17/29* (2015.01)

(58) Field of Classification Search
USPC .................................................. 375/224, 220
See application file for complete search history.

(56) References Cited

U.S. PATENT DOCUMENTS

| | | |
|---|---|---|
| 2006/0012388 A1 | 1/2006 | Lin et al. |
| 2008/0020746 A1* | 1/2008 | Alexandar ............ H04W 24/06 455/423 |
| 2008/0287117 A1 | 11/2008 | Olgaard et al. |
| 2012/0213112 A1 | 8/2012 | Olgaard et al. |
| 2012/0231744 A1 | 9/2012 | Gregg et al. |
| 2012/0231745 A1* | 9/2012 | Gregg et al. ............... 455/67.12 |
| 2013/0028100 A1 | 1/2013 | Olgaard |

OTHER PUBLICATIONS

International Search Report and Written Opinion for PCT/US2014/046621 issued on Nov. 18, 2014, 11 pages.
International Preliminary Report on Patentability mailed on Feb. 18, 2016 in PCT/US2014/046621; 8 pgs.

* cited by examiner

*Primary Examiner* — Kabir A Timory
(74) *Attorney, Agent, or Firm* — Banner & Witcoff, Ltd.

(57) ABSTRACT

A method for using a test data packet signal to test a data packet signal transceiver device under test (DUT) having an operating characteristic defined by a data packet error rate (PER) as a function of data packet signal power (PWR). The test data packet signal power is varied and a test PER is computed as a function of DUT response data packets and test data packets until a measured test PER or a computed test PER extrapolated from measured PERs is equal to a predetermined PER less than and greater than maximum and minimum PERs, respectively.

16 Claims, 7 Drawing Sheets

POWER VERSUS PER PERCENTAGE

FIG. 8

METHOD FOR TESTING SENSITIVITY OF A DATA PACKET SIGNAL TRANSCEIVER

BACKGROUND

The present invention relates to testing data packet transceivers, and in particular, to testing data packet signal transceiver sensitivity.

Many of today's electronic devices use wireless technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless technologies must adhere to various wireless technology standard specifications.

When deciding such wireless devices, engineers take extra care to ensure that such devices will meet or exceed each of their included wireless technology prescribed standard-based specifications. Furthermore, when these devices are later being manufactured in quantity, they are tested to ensure that manufacturing defects will not cause improper operation, including their adherence to the included wireless technology standard-based specifications.

For testing these devices following their manufacture and assembly, current wireless device test systems employ a subsystem for analyzing signals received from each device. Such subsystems typically include at least a vector signal generator (VSG) for providing the source signals to be transmitted to the device under test, and a vector signal analyzer (VSA) for analyzing signals produced by the device under test. The production of test signals by the VSG and signal analysis performed by the VSA are generally programmable so as to allow each to be used for testing a variety of devices for adherence to a variety of wireless technology standards with differing frequency ranges, bandwidths and signal modulation characteristics.

As part of the manufacturing of wireless communication devices, one significant component of production cost is costs associated with manufacturing tests. Typically, there is a direct correlation between the cost of test and the time required to perform the test. Thus, innovations that can shorten test time without compromising test accuracy or increasing Equipment costs (e.g., increasing costs due to increasing sophistication of necessary test equipment, or testers) are important and can provide significant costs savings, particularly in view of the large numbers of such devices being manufactured and tested.

A common receiver (RX) test for such DUTs is determining signal sensitivity as a function of power level, e.g., the signal envelope power of the data packet signal, where some standard prescribed upper limit on packet error rate (PER) occurs (e.g., PER=(T−A)/T, where T=number of test data packets, and A=number of Acknowledgement data packets). For example, one sensitivity point can be defined as the power level where no more than 10% of the detected data packets are received incorrectly, i.e., where the packet data and appended check sum agree.

To determine such a sensitivity point, a sufficient number of data packets are required to be sent to the DUT by the tester to ensure that at least 90% of the data packets sent are correctly received. This would then establish the desired sensitivity point. However, if the test yields a PER different than 10%, it may be difficult to derive useful information about the sensitivity of the DUT. For example, if the PER is 0%, i.e., all data packets have been received correctly, or 100%, i.e., no data packets have been received correctly, very little information can be derived from such a PER, other than a conclusion that the DUT is better or worse than the tested level.

Accordingly, it would be desirable to have a technique for testing sensitivity of a DUT such that PER can be tested accurately in a time efficient manner.

SUMMARY

In accordance with the presently claimed invention, a method is provided for using a test data packet signal to test a data packet signal transceiver device under test (DUT) having an operating characteristic defined by a data packet error rate (PER) as a function of data packet signal power (PWR). The test data packet signal power is varied and a test PER is computed as a function of DUT response data packets and test data packets until a measured test PER or a computed test PER extrapolated from measured PERs is equal to a predetermined PER less than and greater than maximum and minimum PERs, respectively.

In accordance with one embodiment of the presently claimed invention, a method of testing a data packet signal transceiver includes: providing a test data packet signal having a test data packet signal power and including a plurality of test data packets and a plurality of test data packet signal power levels for reception by a device under test (DUT) having an operating characteristic defined by a data packet error rate (PER) as a function of data packet signal power (PWR) with a maximum PER at a minimum PWR, a minimum PER at a maximum PWR and a plurality of intermediate data packet error rates (PERs) at a plurality of intermediate data packet signal powers (PWRs) between the minimum PWR and the maximum PWR; receiving, from the DUT, one or more response data packets corresponding to at least a portion of the plurality of test data packets; computing a test PER as a function of the one or more response data packets and the plurality of test data packets; and repeating the providing, receiving and computing while varying the test data packet signal power to produce a plurality of test PERs until the plurality of test PERs includes at least one of a measured test PER substantially equal to a predetermined one of the plurality of intermediate PERs at one of the plurality of intermediate PWRs, and at least one higher test PER and one lower test PER than the predetermined one of the plurality of intermediate PERs at one of the plurality of intermediate PWRs.

In accordance with another embodiment of the presently claimed invention, a method of testing a data packet signal transceiver includes: receiving, with a data packet signal transceiver device under test (DUT), a test data packet signal having a test data packet signal power and including a plurality of test data packets and a plurality of test data packet signal power levels, wherein the DUT has an operating characteristic defined by a data packet error rate (PER) as a function of data packet signal power (PWR) with a maximum PER at a minimum PWR, a minimum PER at a maximum PWR and a plurality of intermediate data packet error rates (PERs) at a plurality of intermediate data packet signal powers (PWRs) between the minimum PWR and the maximum PWR; providing, with the DUT, one or more response data packets corresponding to at least a portion of the plurality of test data packets; computing a test PER as a function of the one or more response data packets and the plurality of test data packets; and repeating the receiving, providing and computing while the test data packet signal power varies to produce a plurality of test PERs until the plurality of test PERs includes at least one of a measured test PER substantially equal to a predetermined one of the plurality of intermediate PERs at one of the plurality of intermediate PWRs, and at least one higher test PER and one lower test PER than the predetermined one of the plurality of intermediate PERs at one of the plurality of intermediate PWRs.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

A PER is typically selected as a value where DUT performance becomes sufficiently impacted to negatively affect the desired level of DUT performance. However, by knowing the performance curve, i.e., the packet error rate has a function of data packet signal power, one can use a different PER value and extrapolate back to a desired PER value. For example, a PER of 50% occurs at a point on the modulation curve (PER vs data packet signal envelope power) where the slope of the function is usually greatest, as a result of which there are greater changes in measured PER over the same change in data packet signal power variations than at the point on the function corresponding to a 10% PER. This will ensure that the tested PER has high sensitivity to signal power variation. Further, when starting from the 50% PER point, larger variations in PER will occur for smaller variations in data packet signal power. As a result, fewer test data packets are needed, statistically, to determine a PER with good testing accuracy. Plus, fewer test data packets required translates to less testing time.

Having the 50% PER point available also enables tracking of manufacturing variations at least as well as the 10% PER point, since changes in DUT performance will become evident more quickly. This is in contrast to retrieving a PER rate at a data packet signal power level slightly higher than the sensitivity point. Testing at the 50% point will allow tracking of the influence of noise figure and other parameters. In contrast thereto, testing at a 0% PER point will indicate only that performance is better than certain desired level.

As discussed in more detail below, in accordance with the presently claimed invention, the data packet signal power where a 50% PER occurs can be determined, thereby allowing, in conjunction with such value and the modulation curve for a DUT, the DUT's prescribed sensitivity point to be determined more accurately. The 50% PER point represents a value that can be tracked during manufacturing and allow for easy extraction of a prescribed sensitivity point (e.g. 10%) by simply offsetting the 50% PER point. Such offset can be obtained by a one-time characterization of the DUT through traditional PER sweep testing, where the traditional PER measurement is implemented for many consecutive data packet signal power levels and a PER versus data packet signal power level curve is extracted. An additional benefit is realized by the use of confirmation packets (e.g., acknowledgment, or "ACK", data packets) in response to test data packets, thereby providing immediate feedback on each data packet being correctly received by the DUT.

Hence, in accordance with the presently claimed invention, the 50% PER point can be found and used for tracking changes to the performance of a DUT over time and to determine whether the DUT meets a standard-prescribed sensitivity metric. Further, by using confirmation data packets, it can be determined in real time whether a data packet has been correctly received. A one-time test can be performed at a prescribed sensitivity point after which the power level offset between such sensitivity point and the 50% PER point can be found. Thereafter, when testing similar DUTs, such offset from the power level for the 50% PER point can be used to determine if the DUT meets or exceeds the prescribed sensitivity point, as well as accurately track performance drift of the manufactured devices over time using variations about the 50% PER point.

Figure 1:
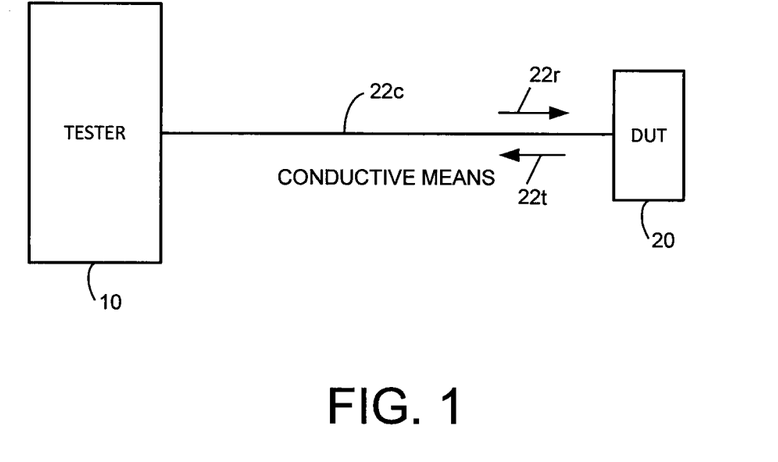
FIG. 1 depicts a test environment for testing data packet transceivers in accordance with exemplary embodiments of the presently claimed invention.

Referring to FIG. 1, a typical testing environment for testing sensitivity of a data packet transceiver in accordance with the presently claimed invention includes a tester 10 coupled to a DUT 20 via a signal path 22c. The tester 10 includes one or more signal sources (not shown), such as one more vector signal generators (VSG), and signal analysis circuitry (not shown), such as a vector signal analyzer (VSA), to provide a receive signal 22r in the form of a test data packet signal and to receive a DUT transmit signal 22t in the form of a return data packet signal, respectively. This signal path 22c is typically a conductive signal path, e.g., in the form of a radio frequency (RF) cable and connectors.

Figure 2:
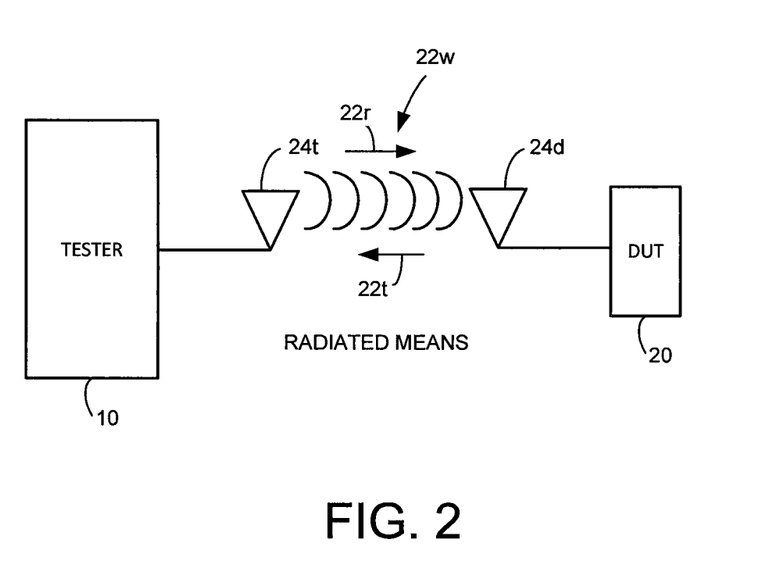
FIG. 2 depicts another test environment for testing data packet transceivers in accordance with exemplary embodiments of the presently claimed invention.

Referring to FIG. 2, an alternative testing environment can include a wireless signal path 22w via which the receive 22r and transmit 22t data packet signals are conveyed by way of radiated electromagnetic energy using one more antennas 24t coupled to the tester 10 and another one or more antennas 24d coupled to the DUT 20.

When testing a wireless transceiver or receiver to determine whether it meets or exceeds a sensitivity metric (e.g., as is often required by the underlining standard to which the DUT is intended to adhere), it is typically necessary to find a power level where one in ten of the detected data packets results in no confirmation data packet due to a disagreement between packet data and an appended check sum. In other words, one in ten detected data packets fails to be received correctly by the DUT receiver. Where a standard specification calls for a maximum PER of 10%, the tester 10 (FIGS. 1 and 2) typically sends a number of test data packets and compares that number to how many data packets are correctly received based on the number of confirmation data packets that are returned by the DUT 20. With a PER of 10%, it becomes necessary to send a relatively large number of data packets before a variation in PER measurements falls within the bounds of the standard-prescribed tolerances. Further, because the slope of the modulation curve about the 10% PER point is approaching zero (horizontal), a small increase in signal power can push the measured PER to 0% while providing little or no additional useful information as power levels increase further.

Alternatively, it can be beneficial to find the power level where the PER is 50%, at which point changes in PER are more sensitive to changes in power level, and there are greater ranges of PER values on either side of that point, i.e., at lower and higher power levels. Consequently, a greater range of PER values can be measured as the power level increases or decreases from that at which the PER is 50%. For example, whereas at the 10% PER point, increases in signal power, regardless of how large, can only cause the PER to decrease to 0%, i.e., a change of 10%, starting from the 50% PER point allows power increases to cause the PER to also decrease to 0%, but now resulting in a 50% PER change. Accordingly, significantly more useful information about performance variations can be obtained when testing is centered about the 50% PER point rather than being centered about the 10% PER point. Further, since the PER curve is steep about the 50% PER point, often significantly more so than that about the 10% PER point, using fewer data packets for equivalent statistical testing accuracy will not impact results significantly, so extrapolation becomes simpler.

Advantageously, a variety of approaches, or algorithms, can be applied to adjust test signal power up or down, depending upon the confirmation data packet response of the DUT to a set of test data packet signals, thereby converging to the 50% PER point. Following an initial test on a DUT model running a comprehensive 0-100% PER test, it can be determined which measured power level should be used to offset the power level measured later for the 50% PER point. Accordingly, future testing need only measure the 50% PER point, from which the offset may be applied to extract a prescribed sensitivity point.

Figure 3:
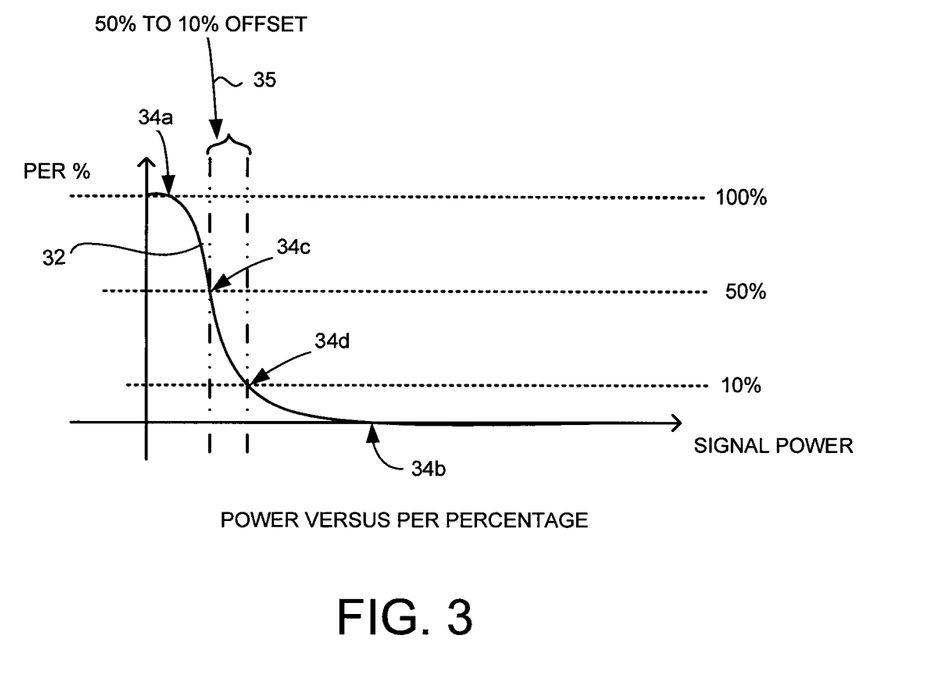
FIG. 3 depicts an exemplary graph of packet error rate (PER) as a function of data packet signal power.

Referring to FIG. 3, as is well-known to one skilled in the art, the modulation curve 32 of the DUT (PER as a function of signal power) includes PER values at a signal power 34a where no packets are received correctly (PER=100%), as well as values 34b where all packets are received correctly (PER=0%). However, this curve 32 is non-linear. At the point 34c where the PER is 50%, PER variation with signal power variation is generally at its sharpest. Thus, the test signal power can be increased or decreased above and below the 50% PER point 34c while measuring a range of PER values of 50% to 0% and 50% to 100%, respectively.

However, at a prescribed sensitivity point 34d of 10% PER, very little additional power will drive the DUT to a 0% PER, with further increases in power yielding no further useful PER information. Further, since the curve 32 is less steep (lower slope) at these points, more test data packets are required to collect a more statistically accurate number of confirmation data packets for the PER at each power level. In other words, since most packets may be received, small numbers of data packets not received can significantly alter the reported PER at a given input level, unless a large number of data packets is used for testing.

Figure 4:
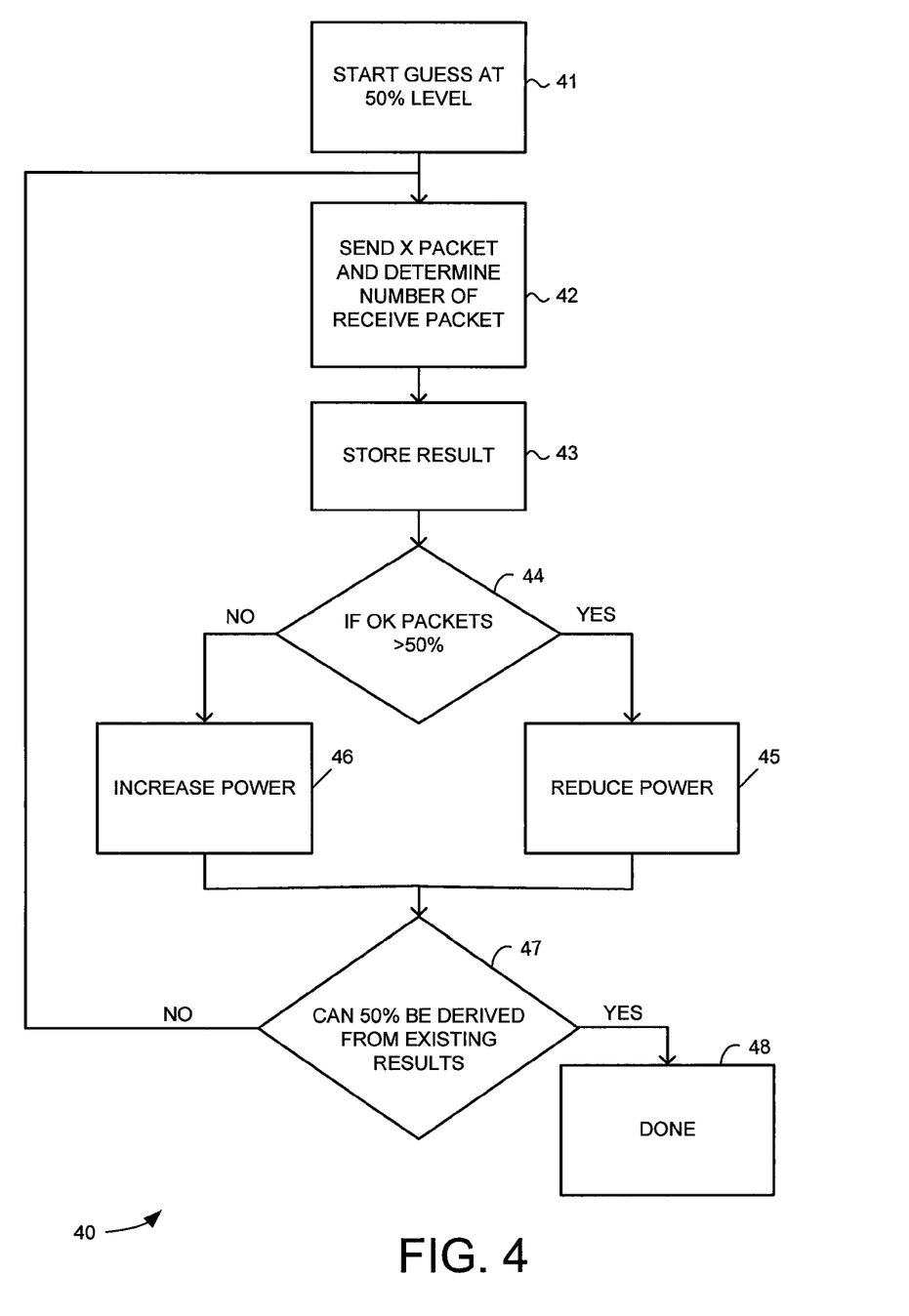
FIG. 4 depicts a flow chart of a sensitivity testing method in accordance with exemplary embodiments of the presently claimed invention.

Referring to FIG. 4, in accordance with exemplary embodiments, determining the 50% PER point can be done as depicted. Initially, testing begins 41 at a power level at which the 50% PER point is expected to be found. This includes sending some number X of test data packets 42 (e.g., one or more, and fixed or dynamically variable with each test loop) and counting the confirmation data packets received in return, with the results being stored 43 as desired. (Among other test parameters, the signal power level at which the test data packets are transmitted can also be stored, e.g., for keeping track of the number of times specific test data packet signal power levels have been used.) It is then determined 44 whether more than half of the data packets that have been sent have been correctly received. If more than half of the packets have been correctly received, the test to signal power is decreased 45. If less than half of the data packets have been correctly received, the signal power is increased 46. The signal power increases and decreases can be fixed at equal or different values, or variable together or independently, e.g., with each test loop. (The number of test data packets and size(s) of power increases and decreases are the primary factors affecting efficiency and accuracy of this test sequence, e.g., with larger power increases and decreases allowing for faster convergence to 50% PER but with some loss in accuracy. Current tests using one test data packet and 0.25 dB power increases and decreases have produced good testing performance.) It is then determined 47 whether a 50% PER point can be derived from the results obtained so far, e.g., either measured directly or computed by extrapolation. (For example, if the collected test data includes 48% and 52% PER values at test data packet signal power levels of P1 and P2, an extrapolated 50% PER can be computed as the power level Pe halfway between P1 and P2, i.e., Pe=(P1+P2)/2.) If so, the test is complete 48. If not the previous steps are repeated.

Figure 5:
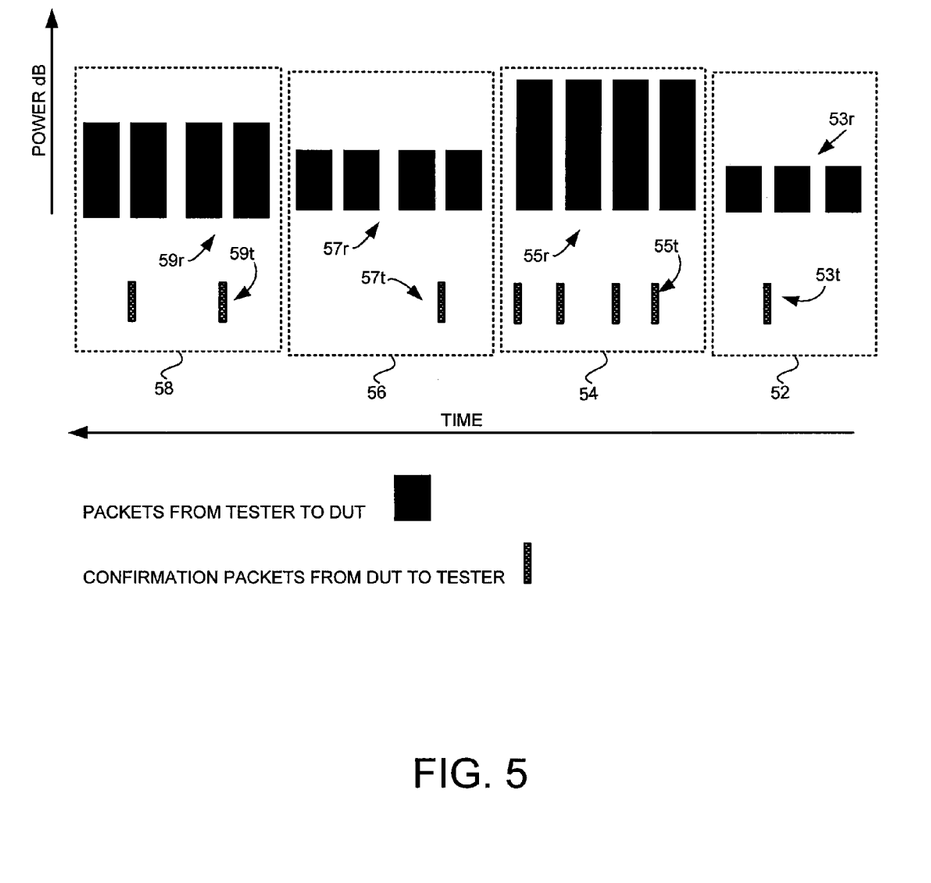
FIG. 5 depicts exchanges of data packets between a tester and a DUT in accordance with a method as depicted in FIG. 4.

Referring to FIG. 5, as a result of the testing operations 40 (FIG. 4), the effects on the test data packets and confirmation data packets can be depicted as shown. For example, during an initial time interval 52, a set of test data packets 53r is sent at an initially low power level, resulting in a number of return data packets 53t indicative of a PER of greater than 50%. During a subsequent time interval 54, test data packets 55r are sent at a higher power level, resulting in confirmation data packets indicative of a PER of 0%. During the next time interval 56, the test data packets 57r are sent at an incrementally lower power level, resulting in confirmation data packets 57t indicative of a PER greater than 50%. During the next time interval 58, test data packets 59r are sent at a incrementally higher power level, resulting in confirmation data packets 59t now indicative of a 50% PER. As a will be readily recognized by one skilled in the art, the number of data packets 53r, 55r, 57r, 59r sent at each power level, their specific power levels, and the incremental changes in power levels (in terms of magnitude and direction) can vary with the specific testing algorithm used (e.g., in accordance with the general test flow depicted in FIG. 4).

Figure 6:
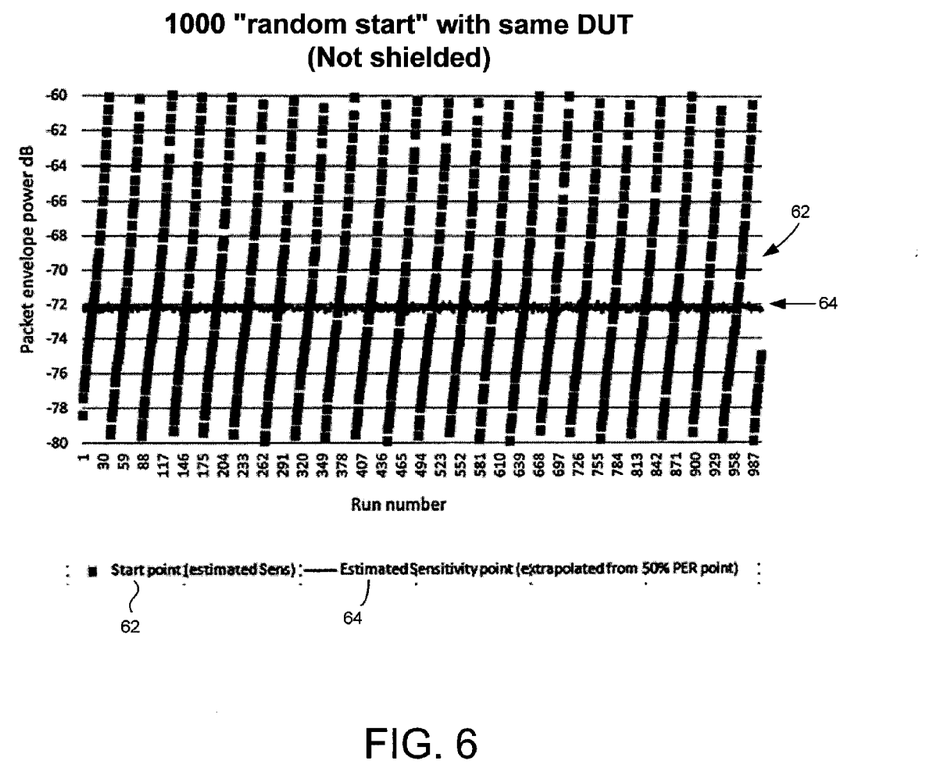
FIG. 6 depicts test results for sensitivity testing of a DUT in accordance with an exemplary embodiment of the presently claimed invention.

Referring to FIG. 6, an example of 1,000 test runs in accordance with an exemplary algorithm with a randomly chosen starting test data packet signal power level can produce results as shown. The test runs depicted here are test runs 1, 30, 88, . . . . In each case, the starting power levels 62 ultimately resulted in an estimated sensitivity point 64 that converged at −72 dB for the power level corresponding to 50% PER after 100-200 test data packets have been sent in accordance with the selected sets and power levels of the algorithm.

Figure 7:
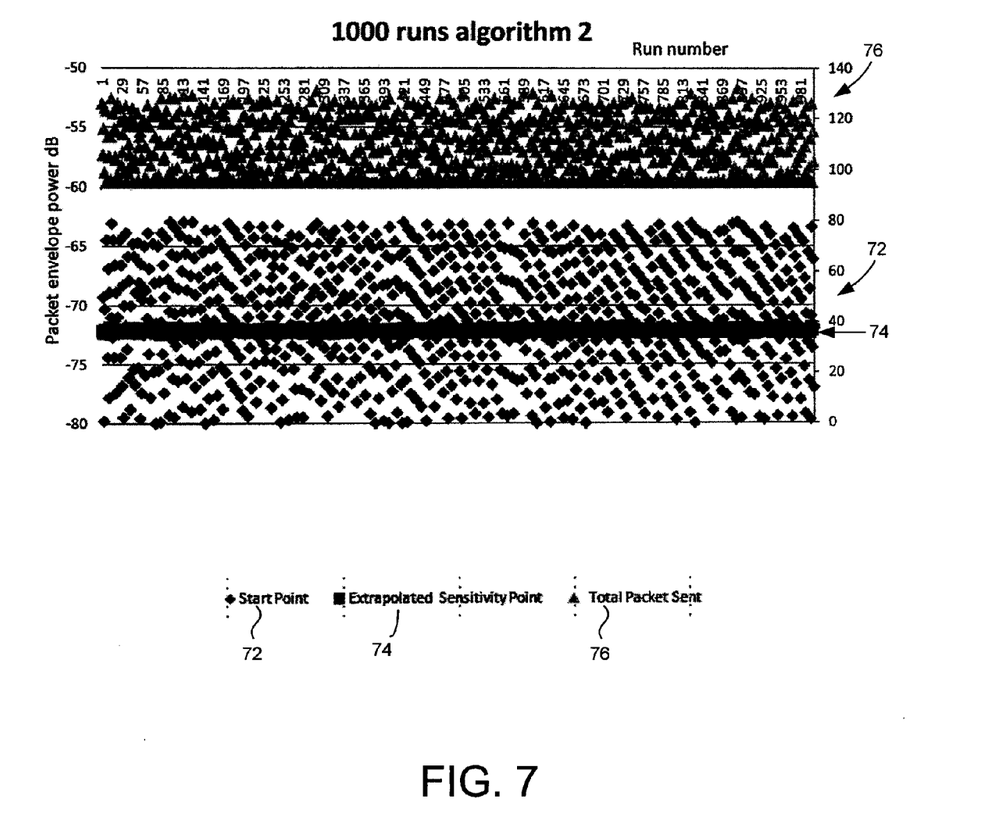
FIG. 7 depicts test results for sensitivity testing of a DUT in accordance with another exemplary embodiment of the presently claimed invention.

Referring to FIG. 7, in accordance with another exemplary algorithm, another 1,000 test runs having different sets of test data packets and signal power increments 72 again resulted in convergence 74 at a power level of −72 dB as the power level producing a 50% PER. In this example, the number of tested data packets 6 per test run varied from less than 100 data packets to less than 140 data packets. A number of test data packets needed can be determined by the exit condition 47 of the exemplary algorithm depicted in FIG. 4.

Figure 8:
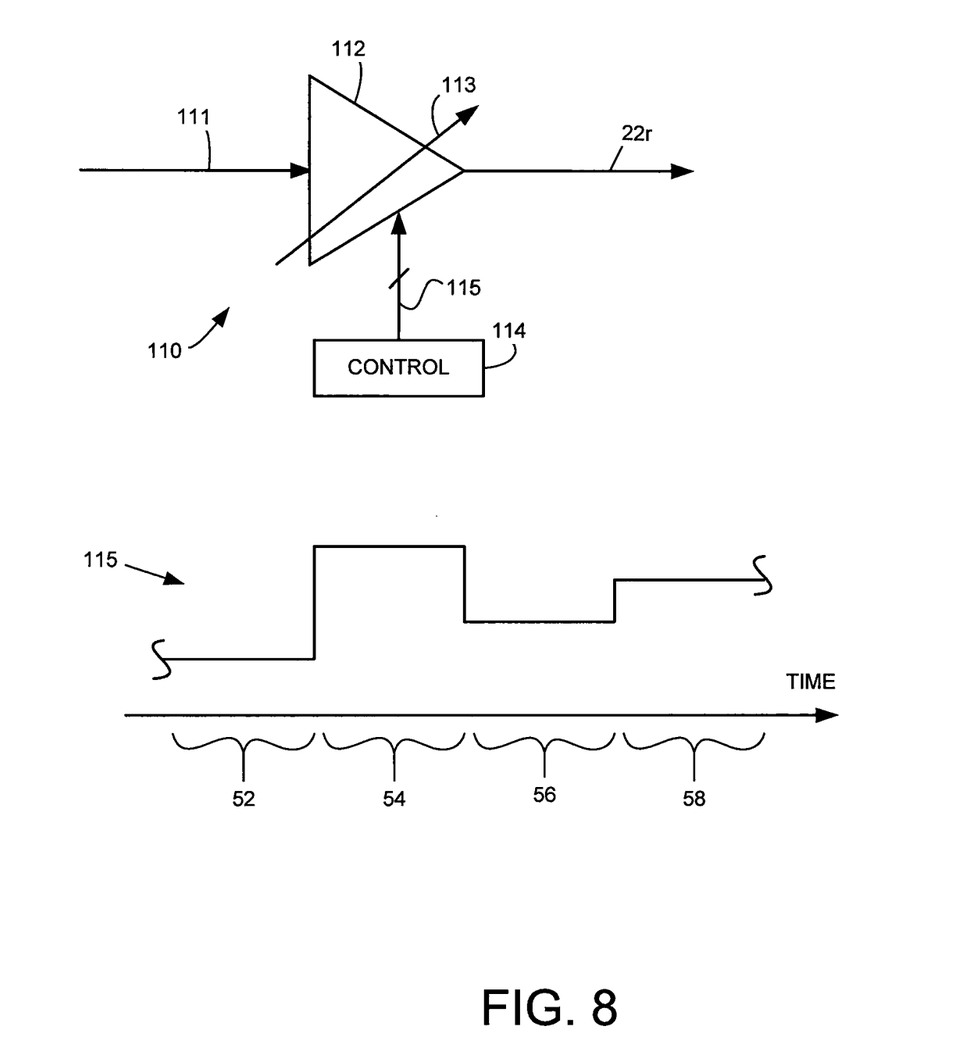
FIG. 8 depicts exemplary circuitry for controlling signal power of the test data packet signal provided by the tester.

Referring to FIG. 8, exemplary circuitry 110 for controlling signal envelope power of the data packet signal 111 provided by the tester 110 (FIGS. 1 and 2) includes a power amplifier 112 with controllable (e.g., programmable) signal gain 113 and control circuitry 114 for providing one or more control signals 115 to establish, vary and otherwise control the signal gain 113. (As will be readily appreciated by those skilled in the art, the controllable gain 113 can be implemented in at least two forms: variable gain circuitry as part of the amplifier circuitry 112; or variable attenuator circuitry (not shown) following the amplifier circuitry 112, thereby allowing scaling of the output signal 22r power while allowing the amplifier circuitry 112 to maintain a constant signal power.) As a result, the DUT receive signal 22r provided by the tester 10 using this amplifier 112 provides data packets having variable power levels, e.g., as depicted in FIG. 5. For example, as further depicted in FIG. 8, the power levels of the data packets 53r, 55r, 57r, 59r during the time intervals 52, 54, 56, 58 can be represented as shown. These relative signal levels of the control signal 115 represent the relative data packet signal power levels.

The control circuitry 114 can be implemented in many ways well known to those skilled in the art. For example, data corresponding to the instructions for generating the appropriate control signals 115 can be stored in various forms of memory circuitry known in the art, and processed using digital processing or logic circuitry, such as a field programmable gate array (FPGA), among many others known in the art, to implement algorithms for increasing and decreasing data packet signal power, e.g., in accordance with sensitivity testing methods such as that depicted in FIG. 4 and discussed above.

As discussed above, once a 50% PER point is determined, different PER points can then be extracted, including a standard-prescribed sensitivity point, by having first found an offset power value for the PER point of interest and then applying such offset 35 (FIG. 3) to the power value resulting in 50% PER.

Additionally, such testing can also be used to track changes in sensitivity of a particular DUT model over a period of time. Using a 50% PER or the extracted sensitivity point, as opposed to using a PER at a fixed power level, enables improved tracking of performance variations during manufacturing. In most cases, a PER near 0% prevents discovery of smaller changes in device performance, whereas a 50% PER point reveals changes quickly.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of testing a data packet signal transceiver, comprising:
   providing, via a signal path, a test data packet signal having a test data packet signal power and including a plurality of test data packets and a plurality of test data packet signal power levels for reception by a device under test (DUT) having an operating characteristic defined by a data packet error rate (PER) as a function of data packet signal power (PWR) with a maximum PER at a minimum PWR, a minimum PER at a maximum PWR and a plurality of intermediate data packet error rates (PERs) at a plurality of intermediate data packet signal powers (PWRs) between said minimum PWR and said maximum PWR;
   receiving, from said DUT via said signal path, a plurality of response data packets each of which is indicative of reception of at least one of said plurality of test data packets;
   computing a test PER as a function of said plurality of response data packets and said plurality of test data packets;
   repeating said providing, receiving and computing while providing said test data packet signal power iteratively at alternating incrementally higher and lower power levels, at least once on a packet-by-packet basis, to produce, as a function of successive ones of said received pluralities of response data packets and corresponding ones of said pluralities of test data packets, a plurality of subsequent test PERs by decreasing said PWR after computing a test PER lower than a predetermined one of said plurality of intermediate PERs at one of said plurality of intermediate PWRs and increasing said PWR after computing a test PER higher than said predetermined one of said plurality of intermediate PERs, wherein said PER as a function of said PWR defines a non-linear modulation curve having a maximum PER versus PWR variation at said predetermined one of said plurality of intermediate PERs, and PER versus PWR variations less than said maximum PER versus PWR variation at remaining ones of said plurality of intermediate PERs higher and lower than said predetermined one of said plurality of intermediate PERs; and terminating said repeating said providing, receiving and computing in response to said plurality of subsequent test PERs including at least one of a measured test PER substantially equal to said predetermined one of said plurality of intermediate PERs, or at least one higher test PER and one lower test PER than said predetermined one of said plurality of intermediate PERs.

2. The method of claim 1, wherein said predetermined one of said plurality of intermediate PERs is substantially equal to 50 percent.

3. The method of claim 1, wherein:
said predetermined one of said plurality of intermediate PERs corresponds to a target one of said plurality of intermediate PWRs; and
said providing a test data packet signal having a test data packet signal power comprises providing said test data packet signal having an initial test data packet signal power less than said target one of said plurality of intermediate PWRs.

4. The method of claim 3, wherein said predetermined one of said plurality of intermediate PERs is substantially equal to 50 percent.

5. The method of claim 1, wherein:
said predetermined one of said plurality of intermediate PERs corresponds to a target one of said plurality of intermediate PWRs; and
said providing a test data packet signal having a test data packet signal power comprises providing said test data packet signal having an initial test data packet signal power greater than said target one of said plurality of intermediate PWRs.

6. The method of claim 5, wherein said predetermined one of said plurality of intermediate PERs is substantially equal to 50 percent.

7. A method of testing a data packet signal transceiver, comprising:
receiving, via a signal path with a data packet signal transceiver device under test (DUT), a test data packet signal having a test data packet signal power and including a plurality of test data packets and a plurality of test data packet signal power levels, wherein said DUT has an operating characteristic defined by a data packet error rate (PER) as a function of data packet signal power (PWR) with a maximum PER at a minimum PWR, a minimum PER at a maximum PWR and a plurality of intermediate data packet error rates (PERs) at a plurality of intermediate data packet signal powers (PWRs) between said minimum PWR and said maximum PWR;
providing, with said DUT via said signal path, a plurality of response data packets each of which is indicative of reception of at least one of said plurality of test data packets;
computing a test PER as a function of said plurality of response data packets and said plurality of test data packets;
repeating said receiving, providing and computing while said test data packet signal power is provided iteratively at alternating incrementally higher and lower power levels, at least once on a packet-by-packet basis, to produce, as a function of successive ones of said received pluralities of response data packets and corresponding ones of said pluralities of test data packets, a plurality of subsequent test PERs by decreasing said PWR after computing a test PER lower than a predetermined one of said plurality of intermediate PERs at one of said plurality of intermediate PWRs and increasing said PWR after computing a test PER higher than said predetermined one of said plurality of intermediate PERs, wherein said PER as a function of said PWR defines a non-linear modulation curve having a maximum PER versus PWR variation at said predetermined one of said plurality of intermediate PERs, and PER versus PWR variations less than said maximum PER versus PWR variation at remaining ones of said plurality of intermediate PERs higher and lower than said predetermined one of said plurality of intermediate PERs; and terminating said repeating said providing, receiving and computing in response to said plurality of subsequent test PERs including at least one of a measured test PER substantially equal to said predetermined one of said plurality of intermediate PERs, or at least one higher test PER and one lower test PER than said predetermined one of said plurality of intermediate PERs.

8. The method of claim 7, wherein said predetermined one of said plurality of intermediate PERs is substantially equal to 50 percent.

9. The method of claim 7, wherein:
said predetermined one of said plurality of intermediate PERs corresponds to a target one of said plurality of intermediate PWRs; and
said receiving, with a data packet signal transceiver device under test (DUT), a test data packet signal having a test data packet signal power comprises receiving said test data packet signal having an initial test data packet signal power less than said target one of said plurality of intermediate PWRs.

10. The method of claim 9, wherein said predetermined one of said plurality of intermediate PERs is substantially equal to 50 percent.

11. The method of claim 7, wherein:
said predetermined one of said plurality of intermediate PERs corresponds to a target one of said plurality of intermediate PWRs; and
said receiving, with a data packet signal transceiver device under test (DUT), a test data packet signal having a test data packet signal power comprises receiving said test data packet signal having an initial test data packet signal power greater than said target one of said plurality of intermediate PWRs.

12. The method of claim 11, wherein said predetermined one of said plurality of intermediate PERs is substantially equal to 50 percent.

13. The method of claim 1, further comprising repeating said providing, receiving and computing further until said plurality of test data packets includes a predetermined minimum number of test data packets.

14. The method of claim 1, further comprising repeating said providing, receiving and computing further until said one or more response data packets includes a predetermined minimum number of response data packets.

15. The method of claim 7, further comprising repeating said receiving, providing and computing further until said plurality of test data packets includes a predetermined minimum number of test data packets.

16. The method of claim 7, further comprising repeating said receiving, providing and computing further until said one or more response data packets includes a predetermined minimum number of response data packets.

* * * * *